United States Patent
Dlugos et al.

(10) Patent No.: US 6,463,133 B1
(45) Date of Patent: Oct. 8, 2002

(54) METHOD AND APPARATUS FOR TELECOMMUNICATIONS SIGNAL ROUTING AND DATA MANAGEMENT

(75) Inventors: Daniel F. Dlugos, Huntington; Stan T. Hagmajer, Stratford; Flavio M. Manduley, Woodbury; Stephen J. Sabulis, Shelton, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/470,730

(22) Filed: Dec. 22, 1999

(51) Int. Cl.⁷ .............................................. H04M 11/00
(52) U.S. Cl. ................ 379/93.11; 705/403; 379/102.01
(58) Field of Search ......................... 379/93.11, 93.09, 379/93.14, 100.15, 100.16, 93.12, 102.01, 102.02; 705/401, 403, 60, 61

(56) References Cited

U.S. PATENT DOCUMENTS

| | | | | |
|---|---|---|---|---|
| 4,106,092 A | | 8/1978 | Millers, II ................... 364/200 |
| 4,275,385 A | | 6/1981 | White ......................... 340/312 |
| 4,812,992 A | * | 3/1989 | Storace et al. ............ 379/93.12 |
| 4,831,554 A | * | 5/1989 | Storace et al. .............. 705/403 |
| 4,926,325 A | | 5/1990 | Benton et al. ............... 364/408 |
| 5,025,383 A | | 6/1991 | Haines et al. .......... 364/464.03 |
| 5,062,133 A | * | 10/1991 | Melrose .................... 379/93.11 |
| 5,070,523 A | * | 12/1991 | Hafer et al. .............. 379/93.14 |
| 5,305,384 A | | 4/1994 | Ashby et al. .................. 380/29 |
| 5,425,051 A | | 6/1995 | Mahany ........................ 375/202 |
| 5,673,308 A | | 9/1997 | Akhavan ...................... 379/61 |
| 5,687,194 A | | 11/1997 | Paneth et al. ............... 375/283 |
| 5,925,101 A | | 7/1999 | Bayless et al. ............. 709/219 |
| 6,038,678 A | | 3/2000 | Fukushima et al. ............ 714/4 |
| 6,161,134 A | | 12/2000 | Wang et al. ................. 709/220 |
| 6,208,864 B1 | | 3/2001 | Agrawal et al. ............ 455/445 |

* cited by examiner

Primary Examiner—Wing Chan
(74) Attorney, Agent, or Firm—Ronald Reichman; Angelo Chaclas

(57) ABSTRACT

A telecommunications signal routing and data management apparatus for directing incoming telecommunications signals to devices connected thereto, or receiving message signals over a telephone subscriber line from a remote source for display, for receiving and transmitting data to and from a remote source over the telephone subscriber line and for storing received data on a programmable memory module is disclosed. The disclosed apparatus enables the uploading and display of postal rate information, uploading of equipment diagnostic information from a programmable memory module and the downloading of postal rate data onto a programmable memory module. Updating of postal equipment, for example, can be carried out with minimal interruptions to the use of the postal equipment.

9 Claims, 3 Drawing Sheets

METHOD AND APPARATUS FOR TELECOMMUNICATIONS SIGNAL ROUTING AND DATA MANAGEMENT

RELATED APPLICATION

Reference is made to application Ser. No. 09/470,585 entitled DATA TRANSFER MODULE AND SYSTEM USING SAME, assigned to the assignee of this application and filed on even date herewith.

TECHNICAL FIELD

The present invention relates to a telecommunications signal routing and data management apparatus. More particularly, the present invention relates to a data and voice telecommunications signal routing and data management apparatus that can be permanently placed between a single telephone line and a variety of data and voice communication devices that can route calls thereto and provide access to a programmable non-volatile memory module for the purpose of convenient uploading of data thereto and downloading of data therefrom.

BACKGROUND OF THE INVENTION

In many businesses, a wide variety of devices are utilized that need to conduct communications over a standard telephone from time to time. For example, a typical office may have a standard telephone, a facsimile machine, a postage scale, postage meter, a mailing machine and/or a photocopier, all of which may require connection to a standard telephone line from time to time. Of course, many offices have only a limited number of telephone lines and it therefore may not be cost effective to have each of the foregoing devices connected to its own telephone line.

Further, postage meters and postage scales require updating of rate tables from time to time. Sometimes it is desirable to obtain diagnostic data from such devices. One way to update the rate tables and obtain diagnostic data automatically from such devices would be to have the device continuously connected to a telephone line for the purpose of receiving updated rate data and exchanging diagnostic data with a central office. However, such continuous connection is inconvenient to the user for several reasons. First, such continuous connection consumes a phone line, possibly requiring the users to obtain multiple phone lines. Second, under such a scenario, it is possible that a central office may initiate a data exchange session just prior to a user's use of the device. While the data exchange session is occurring, such devices are typically rendered inoperable, thereby making the user wait to use the device until the data exchange session is complete. Third, under the same scenario, if the user is using the device, the central office may not be able to carry out a data exchange, although at that time, it may be convenient or efficient for the central office to carry out such an exchange.

Commercially available system integrators or call routers are available for enabling multiple devices to share a single phone line. For example, a 4-port line sharing device marketed under the ASAP 104 trademark is commercially available from Communications Comm., Inc. While the device enables multiple devices to share the same telephone line, such a device does not solve the above-described conflict between a user using the device and a central office desirous of completing a data exchange with the device at the same time.

Accordingly, it would be desirable to provide an apparatus that permits multiple devices to share a single telephone line and allow a virtual data exchange to occur without interrupting the use of any of the devices connected thereto.

SUMMARY OF THE INVENTION

The present invention is therefore directed to a telecommunications signal routing and data management apparatus for directing incoming telecommunications signals to devices connected thereto, for receiving message signals over a telephone subscriber line from a remote source for display, for receiving and transmitting data to and from a remote source over the telephone subscriber line and for storing received data on a programmable non-volatile memory module. The apparatus includes a call router having a telephone subscriber line port connected to a telephone subscriber line and a plurality of signal receiving ports, wherein each of the signal receiving ports is designated to receive a distinct predetermined telecommunications signal type, wherein the router is further adapted to receive a telecommunications signal at the telephone subscriber line port, identify the type of telecommunications signal received, and route the telecommunications signal to the receiving port designated to receive the identified signal type. The apparatus also includes a telecommunications signal converting device, such as modulation/demodulation (modem) device, which has a subscriber line port connected to one of the signal receiving ports of the router, and a data port. The apparatus is further provided with a display device adapted to receive message signals and display messages in accordance with the message signals received, a memory module socket adapted to receive a programmable non-volatile memory module and further adapted to pass data to and from a programmable non-volatile memory module received in the socket. In addition to the above-mentioned components, the apparatus is provided with suitable program memory for storing operating instructions, random access memory for storing data, and a microprocessor which is connected to: the data port of the converting device; the display; the program memory; the random access memory; and the socket. The microprocessor is adapted to: receive operating instructions from the program memory; write data to and receive data from the random access memory; receive data signals from and transmit data signals to the data port of the converting device; transmit display message signals to the display so as to cause messages to be displayed on the display in accordance with the signals; and transmit data to and receive data from a non-volatile memory module received in the socket.

BRIEF DESCRIPTION OF THE DRAWINGS

For a fuller understanding of the nature and objects of the present invention, reference should be made to the following detailed description taken in conjunction with the following drawings in which.

DETAILED DESCRIPTION

Figure 1:
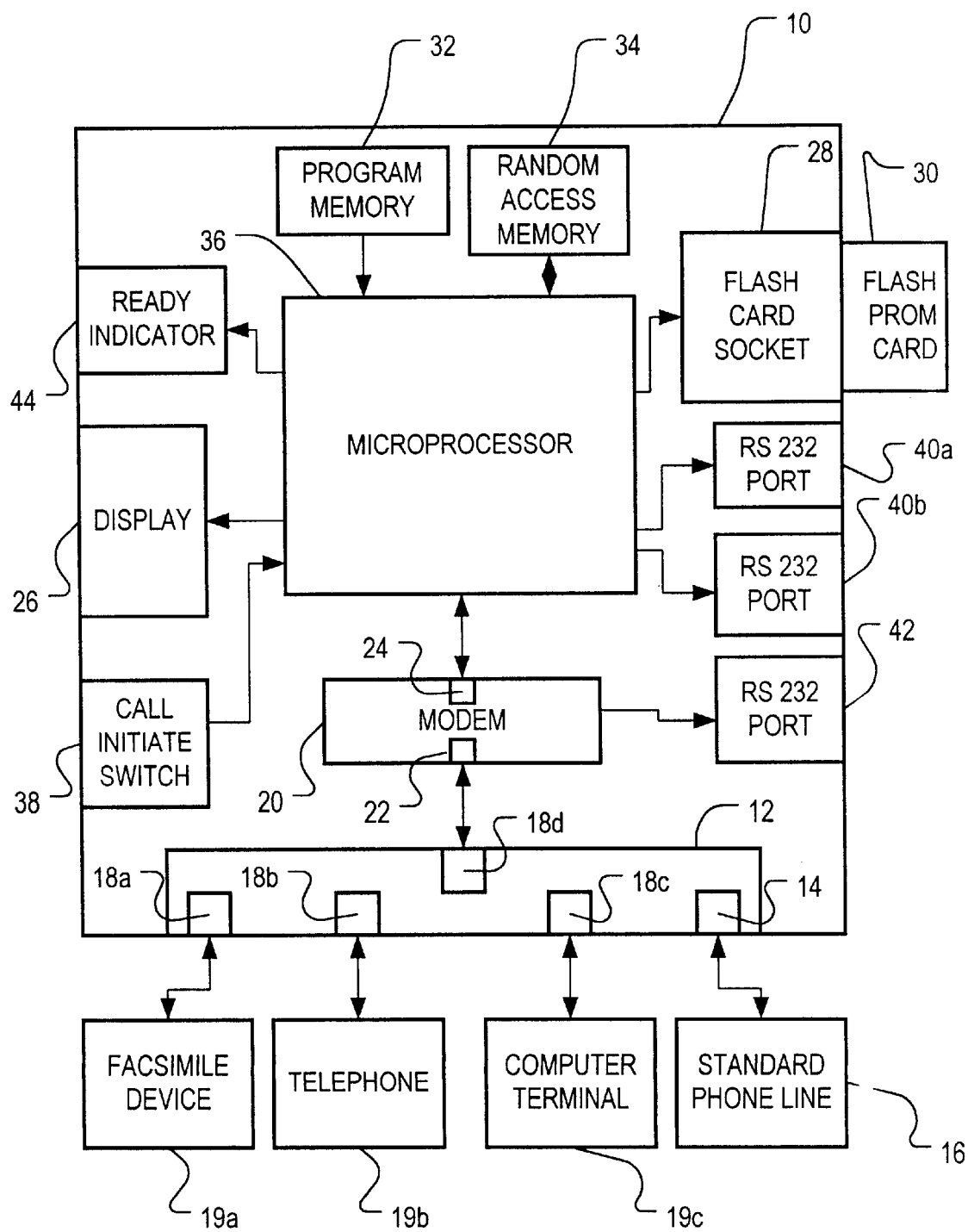
FIG. 1 is a schematic diagram of the signal routing and data managing apparatus for routing incoming telephone calls and for enabling the storage and retrieval of data.

FIG. 1 shows a schematic diagram of a telecommunications signal routing and data management apparatus. The apparatus 10 is capable of directing incoming telecommunications signals to appropriate devices connected thereto and for receiving and displaying messages sent by a central office and for storing data sent by the central office on a memory module associated therewith. More specifically, the apparatus includes an incoming call router 12 which has a telephone line port 14 connected to a standard telephone line 16 for receiving an incoming telecommunications signal. The call router 12 also has a plurality of signal receiving ports 18a–18d. Each of the signal receiving ports 18a–18d is designated to receive a distinct predetermined telecommunications signal type. Equipment such as a facsimile machine 19a, telephone 19b, or the modem of a personal computer 19c may be connected to these ports. The call router 12 is capable of receiving a telecommunications signal at the telephone line port 14, identifying the type of telecommunications signal received, and then routing the telecommunications signal to one of the receiving ports 18a–18d assigned to receive the identified signal type.

Call routing devices as described above are known in the art. One known commercially available device is marketed under the trademark ASAP 104 by Communications Comm, Inc. This device can provide the call routing function as described.

The apparatus 10 also includes a modulation/demodulation device (modem) 20, which has a subscriber line port 22 connected to one of the signal receiving ports, such as port 18d of the router 12. The modem device 20 further includes a data port 24 and circuitry (not shown) for demodulating telecommunications signals received at the subscriber line port 22 into data signals for transmission at the data port 24 and for modulating data signals received at the data port 24 into telecommunications signals for transmission at the subscriber line port 22. Any commercially available modem capable of operating on a standard telephone line will work for the purposes of the present invention. Any other known device which can convert analog telephone signals into digital signals can also be used.

The apparatus 10 further includes a display device 26 which includes circuitry (not shown) capable of receiving message signals and causing messages to be displayed thereon in accordance with the message signals received. The messages displayed on the display may be in the form of symbols or alpha-numeric characters. The display device 26 may be fabricated from any well known and commercially available display devices such as liquid crystal displays, vacuum fluorescent displays, light emitting diode displays or cathode ray tube displays.

Still referring to FIG. 1, the apparatus 10 includes a socket 28 which is constructed to receive a typical programmable non-volatile memory module 30. Such sockets 28 are well known by those skilled in the art and such persons will recognize that these sockets contain contacts (not shown) arranged to interface with the contacts of a programmable non-volatile memory module 30 received in the socket 28 so as to enable the passing of data to and from the programmable non-volatile memory module. Programmable non-volatile memory is commercially available and well known by those skilled in the art. The socket 28 may be fitted with a contact (not shown) or other device sufficient to indicate whether a programmable non-volatile memory module is received in the socket. Any other well known technique for determining whether such a module is received in the socket 28 can be used for the purposes of the present invention.

The apparatus 10 is provided with sufficient program memory 32 suitable for storing operating instructions for the apparatus and sufficient random access memory (RAM) 34 for storing data. The random access memory 34 may be static or dynamic, and non-volatile. Such memory 32, 34 is well known in the art and is commercially available.

The various functions of the apparatus 10 are controlled by a microprocessor 36 which has an associated communications controller (not shown). The microprocessor 36 is connected to: the data port 24 of the modem 20, the display device 26, the program memory 32, the random access memory 34, the socket 28 and programmable non-volatile memory module 30 when such is received in the socket 28. Virtually any commercially available microprocessor such as those made by Intel, Advanced Micro Devices and Motorola, for example, can be used as the microprocessor 36 of the present invention. Under operation, the microprocessor 36 operates in an ordinary manner, receiving its basic operating instructions from the program memory 32. The operating instructions cause the microprocessor 36 to write data to and receive data from the random access memory 34 from time to time, receive data signals from and transmit data signals to the data port 24 of the modem 20, transmit display message signals to the display device 26 so as to cause messages to be displayed on the display device 26 in accordance with such signals, and transmit data to and receive data from the memory module received in the socket 28.

Figure 2:
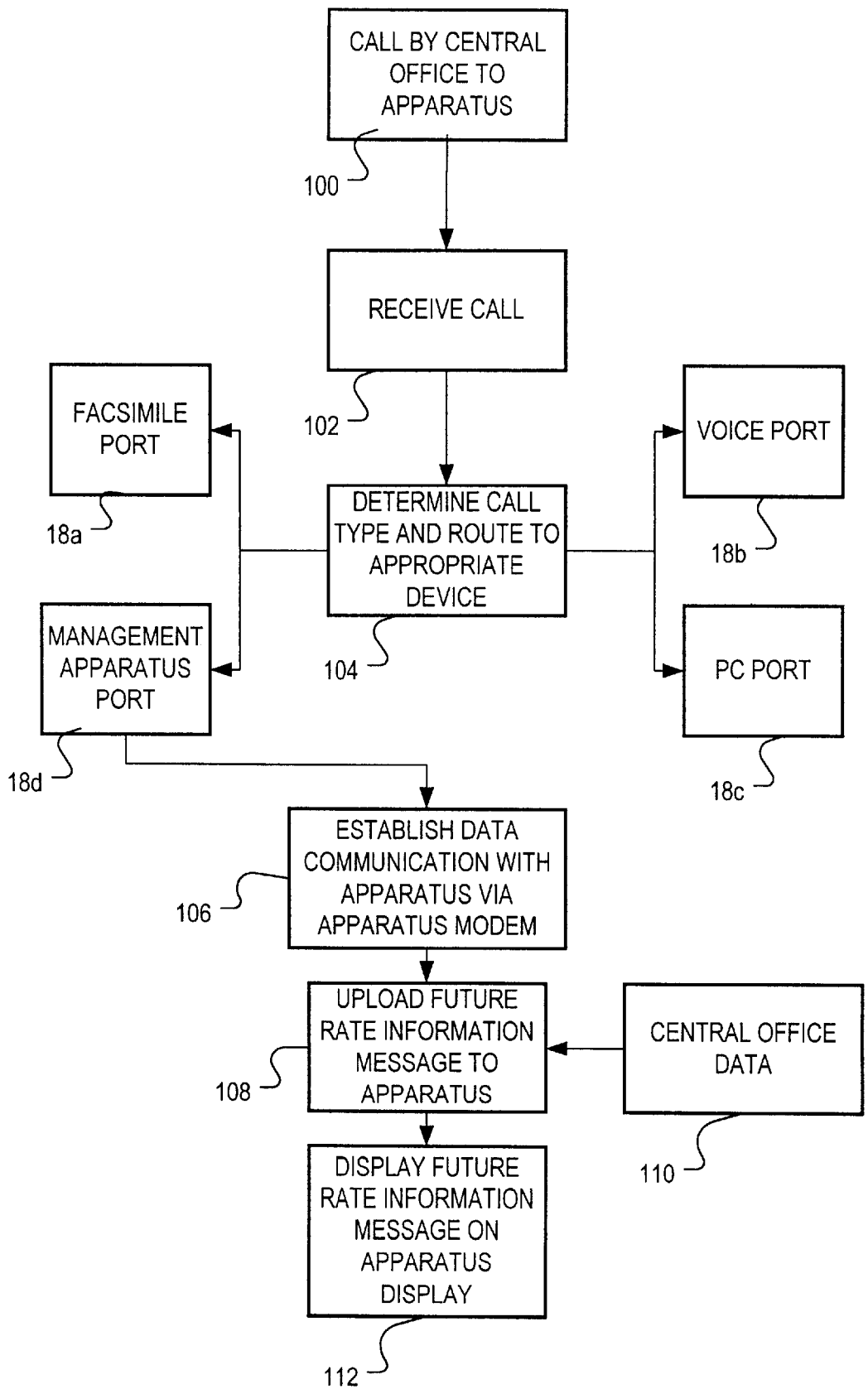
FIG. 2 is a flow diagram illustrating the routing of incoming telephone calls and the uploading of a rate information message by a central office to the routing and data managing apparatus of the present invention.

The apparatus 10 of the present invention can permit the uploading of data or information from a central office over a telephone subscriber line, which is initiated by the central office, to the apparatus 10 to cause a message to be displayed on its display device 26. For example, the central office may wish to communicate to a postal scale or meter user that the postal rates are changing and the postal scale or meter rate tables, held on a flash programmable read-only memory module such as 30, will require modification. This is accomplished, in part, by the steps shown in the flow diagram of FIG. 2. Referring to FIG. 2, the uploading may be initiated when a call by the central office is made 100 over a telephone subscriber line and is received 102 at the telephone subscriber line port 14 of the call router 12. The router 12, based upon the distinct signal type, such as 1100 Hz CNG tone, 2225 Hz reverse modem tone, a 1300 Hz modem tone, distinctive rings, etc., provided by the central office, determines 102 that the call should be routed to the designated receiving port 18d in which the apparatus' modem 20 is connected. Once data communications have been established 106, the central office uploads 108 a future rate information message from the remote central office database 110 which may include instructions to the scale user to remove the scale's flash programmable memory module 30 and insert it into the socket 28 and then initiate a call to the central office by pressing a call initiation switch 38 on the apparatus 10. The microprocessor 36 causes the message to be displayed 112 on the display device 26.

Figure 3:
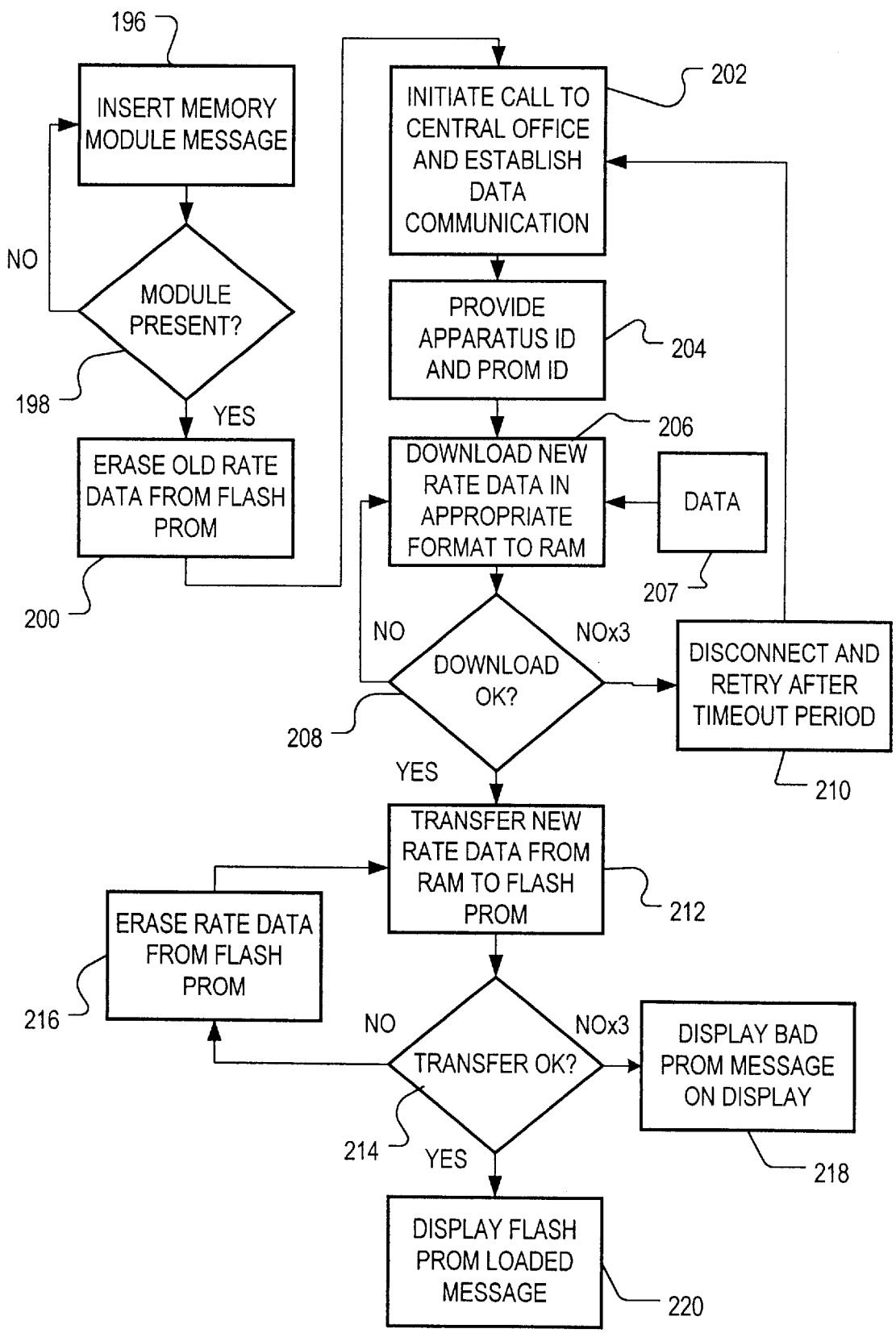
FIG. 3 is a flow diagram illustrating the downloading of new rate data to the flash prom of the signal routing and data managing apparatus of the present invention.

Referring to FIG. 3, a user of the scale, for example, following the instructions displayed 196 on display device 26, as described above, takes the programmable nonvolatile memory module 30 from the scale and inserts it into the socket 28 and activates the call initiation switch 38. Activation of the switch causes the microprocessor to retrieve operating instructions from a segment of the program memory 32 storing instructions which are pertinent to the particular message previously sent and displayed. At this time, the microprocessor 36 determines 198 whether a programmable nonvolatile memory module 30 is present in or absent from the socket 28. If the module 30 is determined to be absent, the microprocessor 36 causes a message signal to be sent to the display device 26 indicating the absence of the memory module 30. A friendly reminder may be included in the message to the user to put the module 30 into the socket 28 or reposition it, for example. If the module 30 is determined to be present, the microprocessor 36 sends data signals to the modem 20 to initiate a call to a predetermined telephone number of the central office, for example. The modem 20 of the apparatus 10 then initiates a call to the central office and establishes data communications with the central office in a typical manner known to those skilled in the art. Once data communication has been established, the apparatus 10 provides identification 204 of the apparatus 10 and the programmable memory module 30. Once the apparatus 10 and the programmable memory module 30 have been identified to the central office, the central office downloads 206 new rate data from its database 207 in an appropriate format for the device receiving the programmable memory module 30 to the apparatus 10 which is stored in the random access memory 34. A checksum error checking routine is performed to determine 208 whether the download was error free. Such error checking routines are well known in the art and are therefore not described herein. If the download was not without error, the apparatus attempts to download the rate data again up to three times. If errors occur more than three times, the apparatus disconnects 210 from the subscriber telephone line 16 and after a time-out period, initiates a call 202 to the central office and begins the above-described sequence again. If the download is determined 208 to be without error, then the new rate data, which may be stored in the random access memory 34, is transferred 212 to the programmable read-only memory module 30. The transfer is checked for errors 214. If errors are detected, any data stored on the memory module 30 is erased 216 and a transfer 212 is re-tried. After three failed attempts to transfer the data, as described above, the apparatus causes a bad programmable read-only memory module message to be displayed 218 on display device 26. If the transfer is determined to be error free, then a message indicating that the data was successfully loaded onto the memory module 30 is displayed on display device 26. This message could instruct the user to transfer the module 30 to a designated scale or postage meter, for example.

If the office environment where the apparatus is located is provided with an extra memory module 30, the extra module may be permitted to reside in the socket 28. From time to time, the central office could then call the apparatus 10 and initiate a download sequence similar to that described above and illustrated in FIG. 3. In this way, memory modules can be automatically updated by the central office as necessary and without the need to follow the routine shown in FIG. 2.

The apparatus of the present invention can also be used to obtain diagnostic data from equipment via the memory module 30 or by interconnection to various equipment through RS 232 ports, such as 40a, 40b and 42. For example, the user may be prompted by way of a message sent according to the routine illustrated in FIG. 2 to plug the memory module 30 into the apparatus' socket 28 and initiate a call so that the central office can read any diagnostic data concerning the equipment from which it came that is stored on the module 30 while the equipment is being used. The apparatus is also provided with a ready indicator 44.

Those skilled in the art will now appreciate that prior to the transfer of data, the data can be encrypted and decrypted so as to ensure that the transfer is secure and has not been tampered with. Any well known data encryption and decryption techniques may be used, such as those which use public or private key management.

As can be seen from the present invention, a user of a piece of equipment, such as a postal scale, which requires updating from time to time can update the equipment with minimal interruptions and maximum convenience.

It is therefore apparent that the objects set forth above and those made apparent from the preceding description are efficiently obtained, and since certain changes in the above architecture and methodology can be made without departing from the scope of the invention, it is intended that all the matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

What is claimed is:

1. A telecommunications signal routing and data management apparatus for directing incoming telecommunications signals to devices connected thereto for receiving signals over a telephone subscriber line from a remote source for display, the apparatus comprising:

(a) a call router having a telephone subscriber line port connected to a telephone subscriber line and a plurality of signal receiving ports, wherein each of the signal receiving ports is designated to receive a distinct telecommunications signal type, wherein the router is further adapted to receive a telecommunications signal at the telephone subscriber line port, identify the type of telecommunications signal received, and route the telecommunications signal to the receiving port designated to receive the identified signal type;

(b) means for converting telecommunications signals received from a telephone subscriber line port into digital signals and for converting digital signals into telecommunications signals for transmission over a telephone subscriber line, wherein the means further include a subscriber line port connected to one of the signal receiving ports of the router, wherein the device further includes a data port;

(c) a display device adapted to receive message signals and display messages in accordance with the message signals received;

(d) program memory for storing operating instructions;

(e) random access memory for storing data;

(f) a socket adapted to receive a programmable memory module;

(g) a microprocessor, wherein the microprocessor is connected to: the data port of the signal converting means, the display, the program memory, the random access memory, and the socket, and wherein the microprocessor is adapted to: receive operating instructions from the program memory, write data to and receive data from the random access memory, receive data signals from and transmit data signals to the data port of the signal converting means, transmit display message signals to the display so as to cause messages to be displayed on the display in accordance with the signals, and receive and transmit data signals to a programmable memory module received in the socket.

2. The apparatus of claim 1, wherein the converting means is a modulation/demodulation device.

3. The apparatus of claim 1, wherein the display device is a liquid crystal display.

4. The apparatus of claim 1, wherein the display device is a cathode ray tube.

5. The apparatus of claim 1, wherein the distinct signal types are distinct tones in the range of 1100 to 2225 Hz.

6. The apparatus of claim 1, wherein the apparatus further comprises at least one communications port adapted to communicate with the microprocessor.

7. The apparatus of claim 1, wherein the apparatus further comprises a means for identifying the apparatus and the programmable memory module and a call switch connected to the microprocessor, and wherein upon receiving a signal from the call switch, the microprocessor is further adapted to:

(a) send data signals to the converting means to establish communications with a remotely located data processing device;

(b) identify the apparatus and programmable memory module to the data processing device; and (c) retrieve data from a flash programmable read-only memory received in the socket and transmit the retrieved data to the data processing device.

8. The apparatus of claim 1, wherein the apparatus further comprises a means for identifying the apparatus, means for determining whether a programmable memory module is received in the socket, means for identifying the programmable memory module and a call switch connected to the microprocessor, and wherein upon receiving a signal from the call switch, the microprocessor is further adapted to:

(a) determine whether a programmable memory module is present in or absent from the socket, if the module is determined to be absent, cause a message signal to be sent to the display indicating the absence of the memory module, if the module is determined to be present, send data signals to the converting means to establish communications with a data processing device having a postal rate database, identify the apparatus and programmable memory module to the data processing device, and retrieve postal rate data from the postal rate database and store the postal rate data on the programmable memory module present in the socket.

9. The apparatus of claim 8, wherein the apparatus has means for decrypting encrypted postal rate data.

* * * * *